(12) United States Patent
Kato et al.

(10) Patent No.: US 11,794,390 B2
(45) Date of Patent: Oct. 24, 2023

(54) INJECTION MOLDING APPARATUS

(71) Applicant: Seiko Epson Corporation, Tokyo (JP)

(72) Inventors: Mitsutoshi Kato, Ota (JP); Seiichiro Yamashita, Yokohama (JP); Shohei Onodera, Akumi (JP); Juri Yamaguchi, Matsumoto (JP); Kana Horiuchi, Kamiina (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/644,565

(22) Filed: Dec. 16, 2021

(65) Prior Publication Data

US 2022/0193966 A1 Jun. 23, 2022

(30) Foreign Application Priority Data

Dec. 17, 2020 (JP) .................. 2020-209031

(51) Int. Cl.
  *B29C 45/16* (2006.01)
  *B29C 45/03* (2006.01)
  (Continued)

(52) U.S. Cl.
  CPC .............. *B29C 45/16* (2013.01); *B29C 45/03* (2013.01); *B29C 45/46* (2013.01); *B29C 45/74* (2013.01);
  (Continued)

(58) Field of Classification Search
  CPC ....... B29C 45/46; B29C 45/464; B29C 45/54; B29C 45/7312; B29C 45/74; B29C 45/03; B29C 45/04; B29C 45/0441; B29C 45/0466; B29C 45/10; B29C 45/12; B29C 45/13; B29C 45/16; B29C 45/1615;
  (Continued)

(56) References Cited

U.S. PATENT DOCUMENTS

| | | | | |
|---|---|---|---|---|
| 2,337,550 A | * | 12/1943 | Crosby | ............... B29C 45/1639 264/328.8 |
| 5,719,225 A | * | 2/1998 | Hirano | ..................... C08K 7/18 523/424 |
| 2020/0055219 A1 | | 2/2020 | Watanabe et al. | |

FOREIGN PATENT DOCUMENTS

| | | |
|---|---|---|
| JP | H02-23390 Y2 | 5/1990 |
| JP | 6281999 B1 | 2/2018 |
| JP | 2020-028975 A | 2/2020 |

OTHER PUBLICATIONS

JPH0223390-Machine Translation (Year: 1990).*

* cited by examiner

*Primary Examiner* — Yunju Kim

(74) *Attorney, Agent, or Firm* — Harness, Dickey & Pierce, P.L.C.

(57) ABSTRACT

An injection molding apparatus includes: a first upstream mold formed with a first gate opening into which a first molding material flows; a second upstream mold formed with a second gate opening into which a second molding material flows; a first injection unit configured to inject the first molding material; a second injection unit configured to inject the second molding material; and a downstream mold configured to be clamped to each of the first upstream mold and the second upstream mold. The first injection unit includes a plasticizing mechanism that plasticizes at least a part of a thermoplastic material containing a thermoplastic resin to generate the first molding material. The second injection unit includes a mechanism that mixes a resin and a curing agent to generate the second molding material that is a thermosetting mixture.

6 Claims, 15 Drawing Sheets

(51) Int. Cl.
   *B29C 45/46* (2006.01)
   *B29C 45/74* (2006.01)
   B29K 101/10 (2006.01)
   B29K 101/12 (2006.01)
(52) U.S. Cl.
   CPC ...... *B29K 2101/10* (2013.01); *B29K 2101/12* (2013.01)
(58) Field of Classification Search
   CPC ............ B29C 45/1628; B29C 45/1676; B29C 2045/1698; B29C 45/1756; B29C 45/1866; B29C 45/22
   See application file for complete search history.

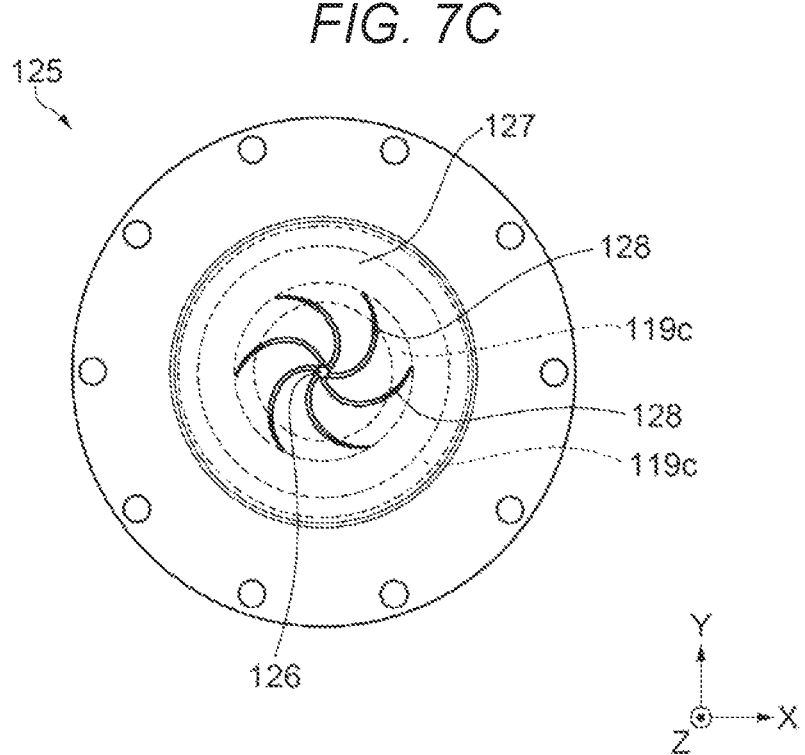

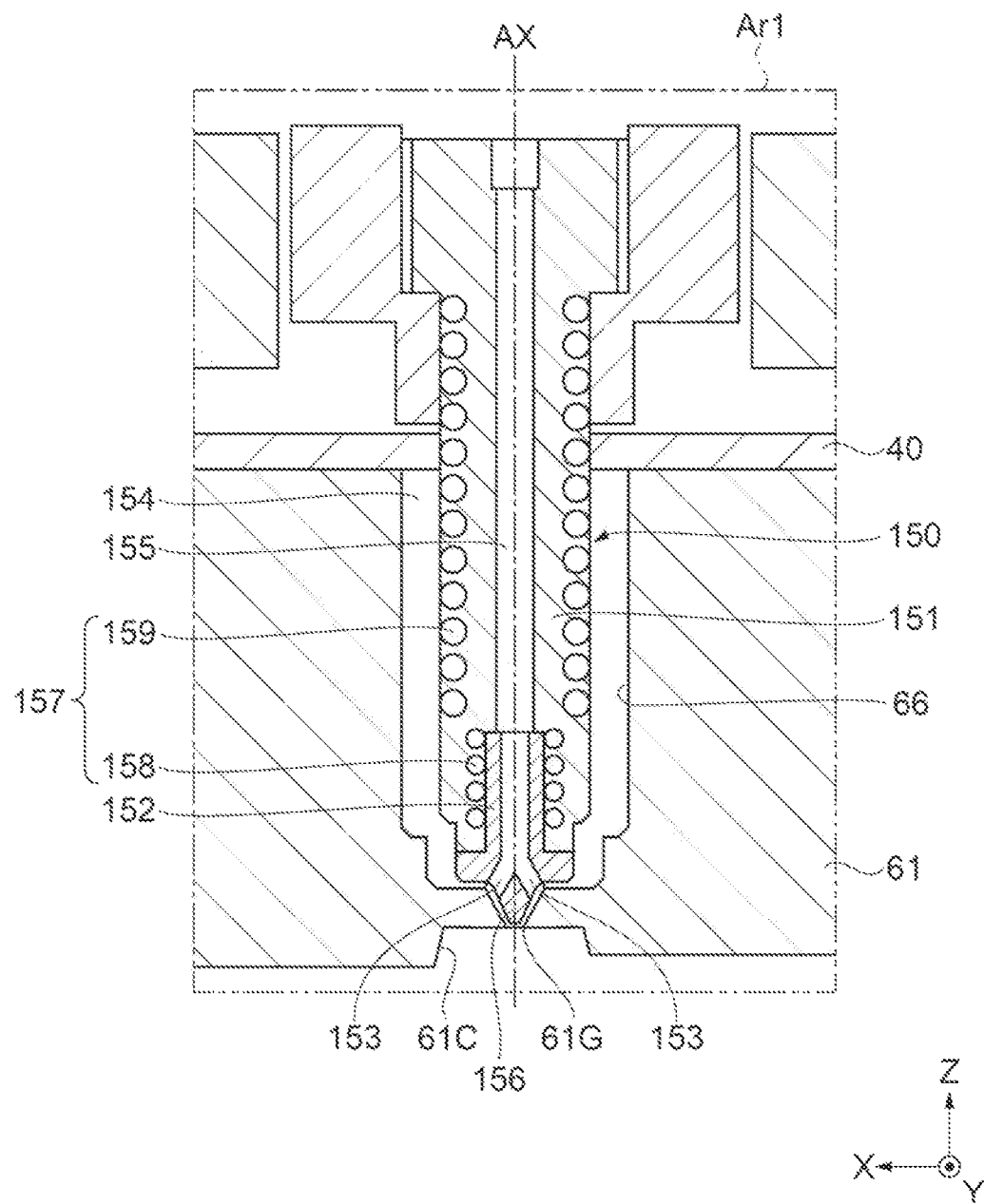

INJECTION MOLDING APPARATUS

The present application is based on, and claims priority from JP Application Serial Number 2020-209031, filed Dec. 17, 2020, the disclosure of which is hereby incorporated by reference herein in its entirety.

BACKGROUND

1. Technical Field

The present disclosure relates to an injection molding apparatus.

2. Related Art

In the related art, an injection molding apparatus for multi-color molding including a plurality of injection units and a plurality of molds is known. For example, JP-UM-B-2-23390 discloses a rotary injection molding machine including three injection units, three fixed molds, and three movable molds. In the rotary injection molding machine, each movable mold is rotatably attached to a movable platen and clamped to a respective one of the fixed molds, and different molding materials are injected from the injection units to perform the multi-color molding.

However, JP-UM-B-2-23390 discloses that materials of different materials are injected, but does not disclose that a thermoplastic material is injected as one material and a thermosetting material is injected as the other material.

SUMMARY

An injection molding apparatus is configured to mold a molded article containing a first molding material and a second molding material. The injection molding apparatus includes: a first upstream mold formed with a first gate opening into which the first molding material flows; a second upstream mold formed with a second gate opening into which the second molding material flows; a first injection unit configured to inject the first molding material through the first gate opening; a second injection unit configured to inject the second molding material through the second gate opening; and a downstream mold configured to be clamped to each of the first upstream mold and the second upstream mold. The first injection unit includes a plasticizing mechanism that plasticizes at least a part of a thermoplastic material containing a thermoplastic resin to generate the first molding material. The second injection unit includes a mechanism that mixes a resin and a curing agent to generate the second molding material that is a thermosetting mixture.

BRIEF DESCRIPTION OF THE DRAWINGS

FIG. 7C is a plan view showing another configuration of the barrel.

FIG. 8 is an enlarged cross-sectional view showing a region Ar1 in FIG. 5.

DESCRIPTION OF EXEMPLARY EMBODIMENTS

In each of the following drawings, X, Y, and Z axes orthogonal to one another are attached as necessary, a direction indicated by each arrow is defined as a + direction, and a direction opposite to the + direction is defined as a − direction. In the following description, it is assumed that gravity acts in a −Y direction. An embodiment to be described below describes an example of the present disclosure.

1. Apparatus Configuration

Figure 1:
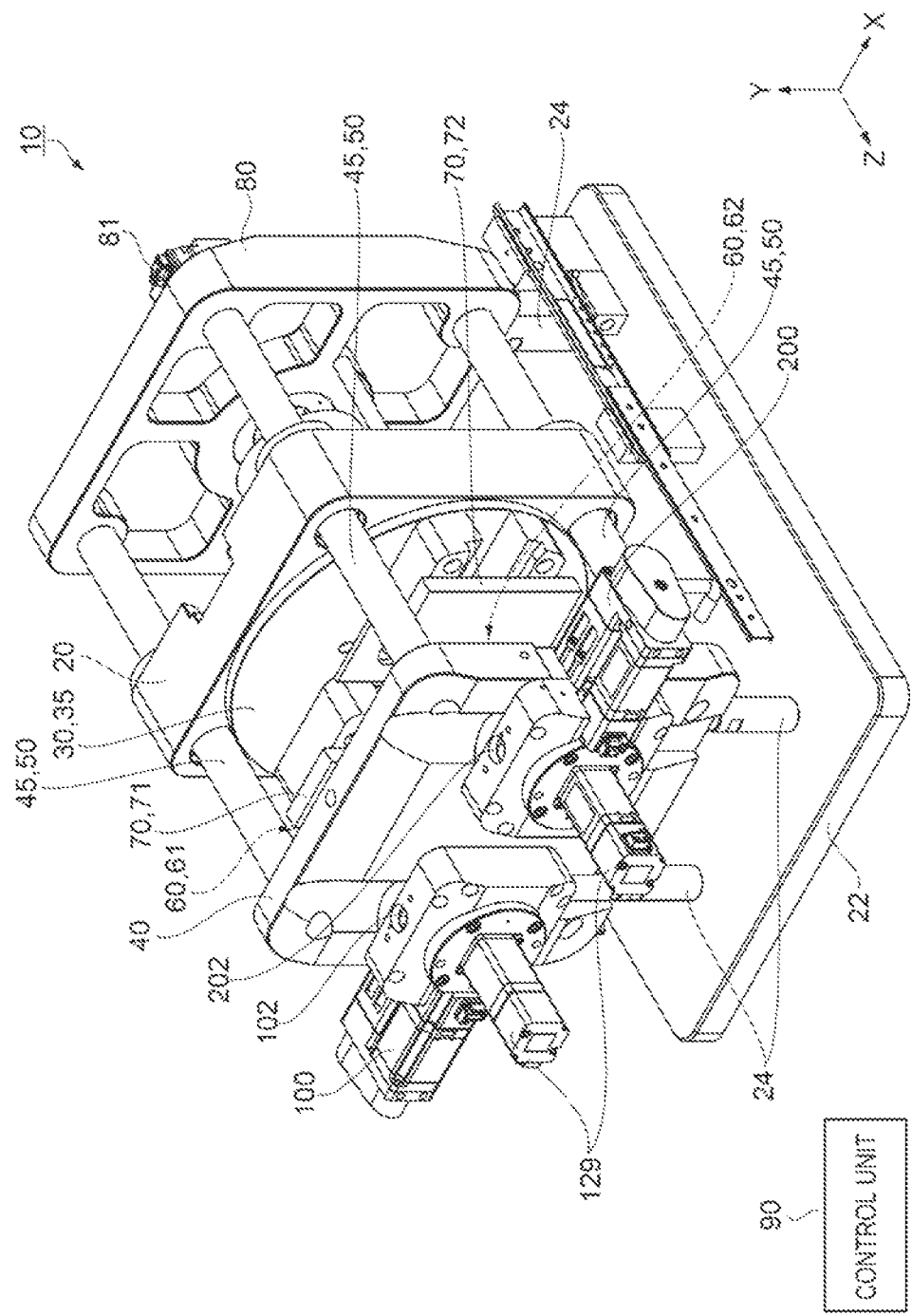
FIG. 1 is a perspective view showing a schematic configuration of an injection molding apparatus according to an embodiment.
Figure 2:
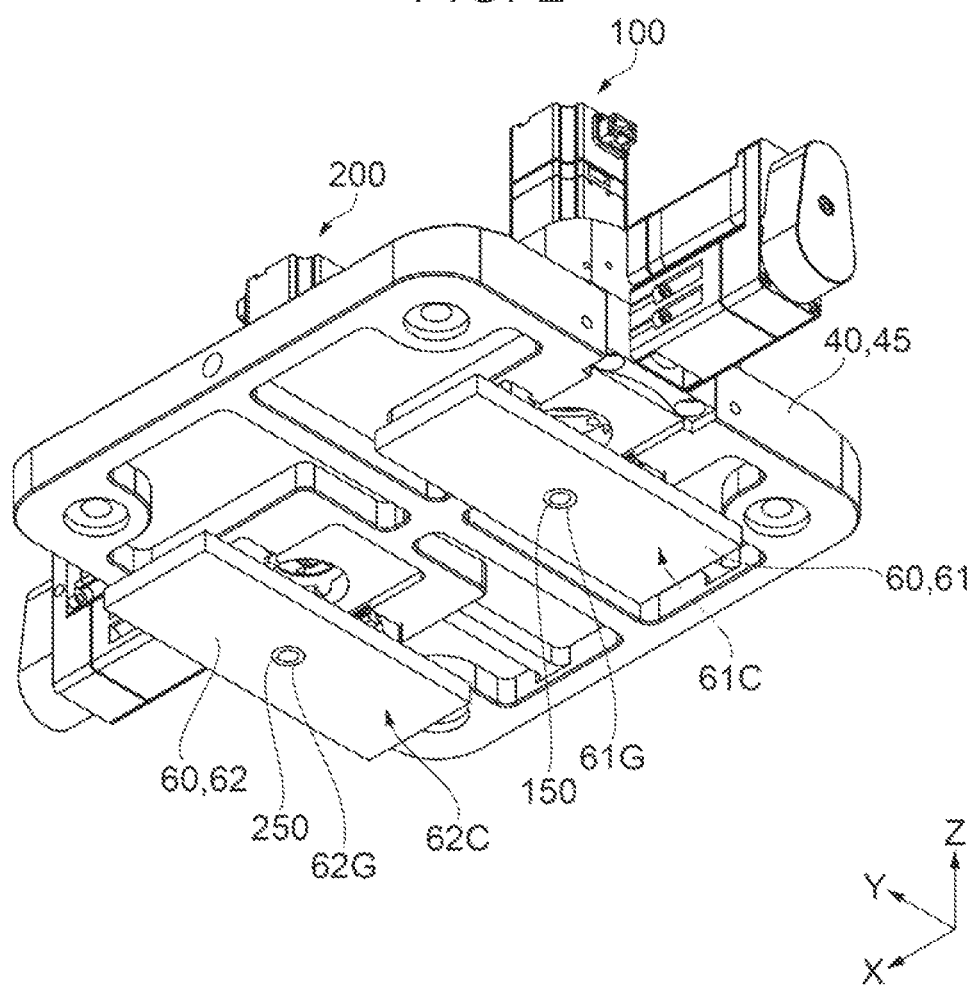
FIG. 2 is a perspective view showing an arrangement of an upper mold and the like on a fixed platen.
Figure 3:
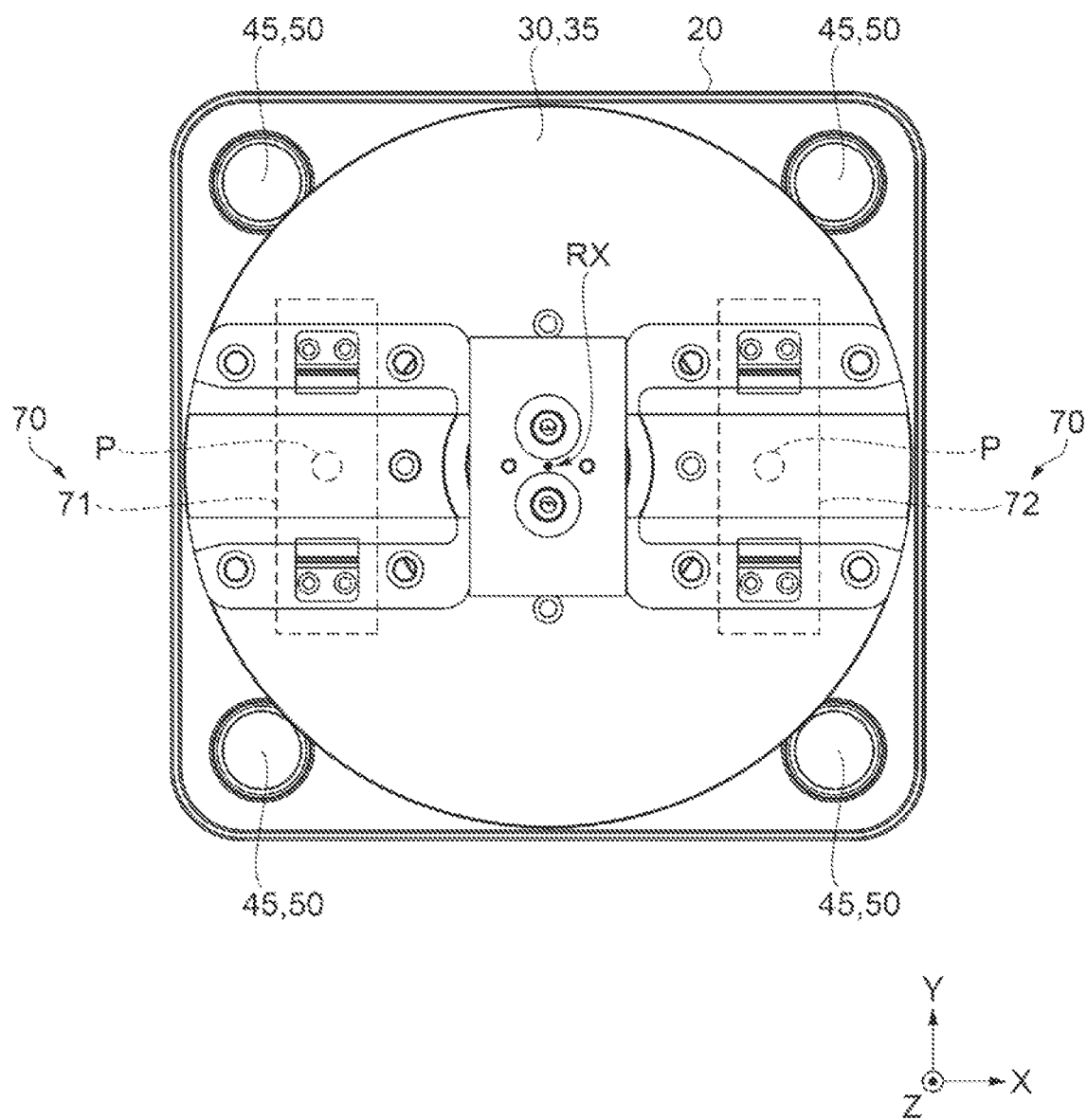
FIG. 3 is a plan view showing an arrangement of a lower mold and the like in a movable platen.

In the present embodiment, an injection molding apparatus including two injection units is exemplified. A schematic configuration of an injection molding apparatus 10 according to the present embodiment will be described with reference to FIGS. 1 to 3. FIG. 1 shows the injection molding apparatus 10 in a mold opened state. FIG. 2 is a perspective view showing a fixed platen 40 of the injection molding apparatus 10 as viewed from a −Z direction. FIG. 3 shows a state in which a movable platen 20 is seen in a plan view from a +Z direction. In FIGS. 1, 2, and 3, a cavity shape of each mold is omitted. The injection molding apparatus according to the present disclosure is not limited to including two injection units, and may include three or more injection units, upper and lower molds whose number corresponds to that of the injection units, and the like.

The injection molding apparatus 10 sequentially injects two different types of molding materials to perform multi-color molding, thereby manufacturing a molded article. The molded article includes a first molding material and a second molding material as two different molding materials. The first molding material is generated by plasticizing at least a part of a thermoplastic material containing a thermoplastic resin. The second molding material is a thermosetting mixture formed by mixing a resin, a curing agent, and the like.

As shown in FIG. 1, the injection molding apparatus 10 includes a first injection unit 100, a second injection unit 200, an upstream mold 60, and a downstream mold 70. The injection molding apparatus 10 is placed on a plate-shaped installation platen 22 along an XZ plane via a plurality of leg portions 24.

The upstream mold 60 includes a first upstream mold 61 corresponding to the first injection unit 100 and a second upstream mold 62 corresponding to the second injection unit 200. The downstream mold 70 includes a first lower mold 71 and a second lower mold 72.

In the following description, the injection performed by the first injection unit 100 is referred to as a first injection, and the injection performed by the second injection unit 200 is referred to as a second injection. For example, the second injection is performed after the first injection to manufacture a molded article. The upstream mold 60 is also referred to as an upper mold 60. The downstream mold 70 is also referred to as a lower mold 70.

In addition to the above-described configuration, the injection molding apparatus 10 includes spacers, which are not shown, corresponding to the movable platen 20, a rotary platen 30, the fixed platen 40, four tie bars 50, a mold clamping device 80, a control unit 90, and the second injection unit 200. The first injection unit 100, the second injection unit 200, and the upper mold 60 are fixed to the fixed platen 40. The fixed platen 40 is fixed to the installation platen 22 via the two leg portions 24. The movable platen 20 moves relative to the fixed platen 40 in the +Z direction opposite to an injection direction at the time of mold clamping. The movable platen 20 is provided with the rotary platen 30. The lower mold 70 is fixed to the rotary platen 30.

The movable platen 20 is a substantially rectangular plate-shaped member. A main surface of the movable platen 20 is disposed along an XY plane. The tie bars 50 penetrate four corners of the main surface of the movable platen 20. The four tie bars 50 are rod-shaped members and are disposed along a Z axis. The four tie bars 50 are fixed to the fixed platen 40 at end portions in the +Z direction, and are fixed to the mold clamping device 80 at end portions in the −Z direction. On the other hand, the movable platen 20 is not fixed to the four tie bars 50. The movable platen 20 is slidably attached to the four tie bars 50. The movable platen 20 moves relative to the fixed platen 40 in a direction along the Z axis while being guided by the four tie bars 50 by a driving force generated by a mold opening and closing motor 81 of the mold clamping device 80. The movable platen 20 moves in the +Z direction to perform the mold clamping. The movable platen 20 moves in the −Z direction to perform mold opening.

The movable platen 20, the four tie bars 50, and the mold opening and closing motor 81 constitute a mold clamping mechanism 45. The mold clamping mechanism 45 performs the mold clamping and the mold opening of the upper mold 60 and the lower mold 70 by changing the relative positions of the upper mold 60 and the lower mold 70 in the direction along the Z axis.

A substantially platen-shaped rotary platen 30 is disposed at a center of the movable platen 20 in the +Z direction. The rotary platen 30 is coupled to a rotary platen motor which is not shown. The rotary platen 30 rotates along the Z axis with a rotation axis RX, which will be described later, as a central axis by a rotational driving force generated by the rotary platen motor. The rotary motor is controlled by the control unit 90. The lower mold 70 is attached to a surface of the rotary platen 30 in the +Z direction. Details of the lower mold 70 will be described later.

The rotary platen 30 and the rotary platen motor constitute a position changing mechanism 35. The position changing mechanism 35 causes the upper mold 60 and the lower mold 70 to selectively face each other. That is, the rotary platen 30 rotates relative to the upper mold 60, so that the arrangement of the first lower mold 71 and the second lower mold 72 of the lower mold 70 facing the first upstream mold 61 and the second upstream mold 62 is switched. Therefore, it is possible to cause each of the first upstream mold 61 and the second upstream mold 62 to face the first lower mold 71 and the second lower mold 72. Hereinafter, the first upstream mold 61 is also referred to as a first upper mold 61, and the second upstream mold 62 is also referred to as a second upper mold 62.

The fixed platen 40 is a substantially rectangular plate-shaped member. A main surface of the fixed platen 40 is disposed along the XY plane. The tie bars 50 are respectively coupled to four corners of the main surface of the fixed platen 40 in the −Z direction. The upper mold 60 is disposed at the main surface of the fixed platen 40 in the −Z direction. The first upper mold 61 and the second upper mold 62 of the upper mold 60 are arranged in a direction along the X axis. The first upper mold 61 is disposed in a −X direction. The second upper mold 62 is disposed in a +X direction.

The upper mold 60 of the fixed platen 40 and the lower mold 70 of the movable platen 20 can be clamped. In a state in which the upper mold 60 and the lower mold 70 are clamped, a space interposed and defined between the upper mold 60 and the lower mold 70 functions as a cavity to be filled with a molding material. A structure of the cavity will be described later. Each of the upper mold 60 and the lower mold 70 is a single mold. That is, the first upper mold 61 and one of the first lower mold 71 and the second lower mold 72 are clamped. At the same time, the second upper mold 62 and the other of the first lower mold 71 and the second lower mold 72 are clamped. Accordingly, two cavities are formed by the upper mold 60 and the lower mold 70.

The first injection unit 100 and the second injection unit 200 are disposed side by side in the direction along the X axis at the main surface of the fixed platen 40 in the +Z direction. The first injection unit 100 is located in the −X direction corresponding to the first upper mold 61. The second injection unit 200 is located in the +X direction corresponding to the second upper mold 62.

As shown in FIG. 2, the first upper mold 61 has a first gate opening 61G and a first upper mold cavity 61C. The second upper mold 62 has a second gate opening 62G and a second upper mold cavity 62C. The first gate opening 61G is formed at the first upper mold 61 in the −Z direction. The first molding material flows into the first gate opening 61G. The second gate opening 62G is formed at the second upper mold 62 in the −Z direction. The second molding material flows into the second gate opening 62G.

Each of the first gate opening 61G and the second gate opening 62G is a substantially circular opening. The positions of the first gate opening 61G and the second gate opening 62G in the direction along the Z axis are different from each other.

The first upper mold cavity 61C communicates with the first gate opening 61G. The second upper mold cavity 62C communicates with the second gate opening 62G. The cavity shape of the first upper mold cavity 61C in the −Z direction is based on a shape of a molded intermediate product molded by the first injection. The cavity shape of the second upper mold cavity 62C in the −Z direction is based on a shape of a molded article molded by the second injection performed after the first injection.

Although not shown, the upper mold 60 and the lower mold 70 are provided with a coolant flow path. A coolant such as water circulates through the coolant flow path, and a temperature rise of the upper mold 60 and the lower mold 70 is prevented. Accordingly, when the thermoplastic first molding material is molded, temperatures of the upper mold 60 and the lower mold 70 are kept lower than a melting temperature of the resin, and thus solidification of the injected first molding material is promoted. When the thermosetting second molding material is molded, the temperature of the molded article may be lowered by circulating the coolant after promoting curing of the second molding material by preventing the circulation of the coolant. The coolant may be circulated at any time of the mold clamping and the mold opening. A known cooling method such as a Peltier element may be employed instead of the cooling performed by the circulation of the coolant.

The first injection unit 100 includes a first nozzle 150 and a plasticizing mechanism which is not shown, and injects the first molding material. The first nozzle 150 is disposed inside the first gate opening 61G. In the first injection, the first molding material is injected from the first nozzle 150 through the first gate opening 61G. The plasticizing mechanism plasticizes at least a part of the thermoplastic material containing the thermoplastic resin to generate the first molding material. Details of the plasticizing mechanism will be described later.

The second injection unit 200 includes a second nozzle 250 and a mechanism that generates the second molding material which is not shown, and injects the second molding material. The second nozzle 250 is disposed inside the second gate opening 62G. In the second injection, the second molding material is injected from the second nozzle 250 through the second gate opening 62G. The mechanism that generates the second molding material mixes the resin and the curing agent to generate the second molding material that is a thermosetting mixture. Hereinafter, the mechanism that generates the second molding material is also referred to as a second molding material generation mechanism.

The arrangement of the first nozzle 150 and the arrangement of the second nozzle 250 in the direction along the Z axis are different from each other. The injection directions of the molding materials from the first nozzle 150 and the second nozzle 250 are the −Z direction and are parallel to each other. The configurations of the first nozzle 150 and the second nozzle 250 will be described later.

As shown in FIG. 3, the first lower mold 71 and the second lower mold 72, which are lower mold 70, are disposed at the rotary platen 30 of the movable platen 20. The first lower mold 71 and the second lower mold 72 are rotationally symmetric with respect to the rotation axis RX. Although not shown, the first lower mold 71 and the second lower mold 72 have the same cavity shape. Hereinafter, the cavities of the first lower mold 71 and the second lower mold 72 are also referred to as lower mold cavities 70C. The lower mold cavity 70C is based on the shape of the molded article.

Here, in FIG. 3, for convenience of description, a position where the lower mold 70 faces the first gate opening 61G and the second gate opening 62G described above is indicated by a dashed circle as a facing position P. At each facing position P, the first lower mold 71 faces one of the first gate opening 61G and the second gate opening 62G, and the second lower mold 72 faces the other of the first gate opening 61G and the second gate opening 62G.

Specifically, for example, when the first lower mold 71 and the first upper mold 61 are clamped, the second lower mold 72 and the second upper mold 62 are clamped. Further, the facing position P of the first lower mold 71 and the first gate opening 61G of the first upper mold 61 face each other, and the facing position P of the second lower mold 72 and the second gate opening 62G of the second upper mold 62 face each other. The facing position P of the first lower mold 71 can also face the second gate opening 62G, and the facing position P of the second lower mold 72 can also face the first gate opening 61G. The facing positions P are not limited to the same arrangement.

Returning to FIG. 1, the mold clamping device 80 includes the mold opening and closing motor 81 and at least two extrusion pins which are not shown. The mold clamping device 80 performs opening and closing of the upper mold 60 and the lower mold 70, that is, the mold opening and mold clamping, by moving the movable platen 20 in the +Z direction.

The mold opening and closing motor 81 is driven under the control of the control unit 90 to move the movable platen 20 along the Z axis. At least one extrusion pin is disposed at a position communicating with the first lower mold cavity of the first lower mold 71 and at a position communicating with the second lower mold cavity of the second lower mold 72. Each of the extrusion pins is driven by the mold opening and closing motor 81 to extrude and mold separate the molded article from the corresponding lower mold cavity at the time of mold opening. Each of the extrusion pins is independently driven.

The control unit 90 controls the entire operation of the injection molding apparatus 10 to perform multi-color molding. The control unit 90 is constituted by a computer including one or a plurality of processors and a main storage device. The control unit 90 implements various functions by the processor executing a program and a command that are read into the main storage device. Instead of the above-described configuration, the control unit 90 may have a configuration in which a plurality of circuits that implement various functions are combined. The control unit 90 outputs a control command to the rotary platen motor, the mold opening and closing motor 81, the first injection unit 100, and the second injection unit 200 described above.

A hopper, which is not shown, is coupled to a first material supply unit 102 of the first injection unit 100. The hopper temporarily stores a thermoplastic material, which is a raw material of the first molding material, and supplies the thermoplastic material to the first injection unit 100 via the first material supply unit 102. The second molding material generation mechanism, which is not shown, is coupled to a second material supply unit 202 on a second injection unit 200 side.

2. First Injection Unit

The configuration of the first injection unit 100 will be described with reference to FIGS. 4 to 8. FIG. 5 shows a cross section along the XZ plane including an axis AX passing through a center of an opening of the first nozzle 150. In FIG. 5, the fixed platen 40 and the first upper mold 61 are also shown in addition to the first injection unit 100. In FIG. 7A, a first heating mechanism 119a embedded in the barrel 125 is indicated by a broken line. In FIG. 7B, a first heating mechanism 119b embedded in the barrel 125 is indicated by a broken line. In FIG. 7C, a first heating mechanism 119c embedded in the barrel 125 is indicated by a broken line.

Figure 4:
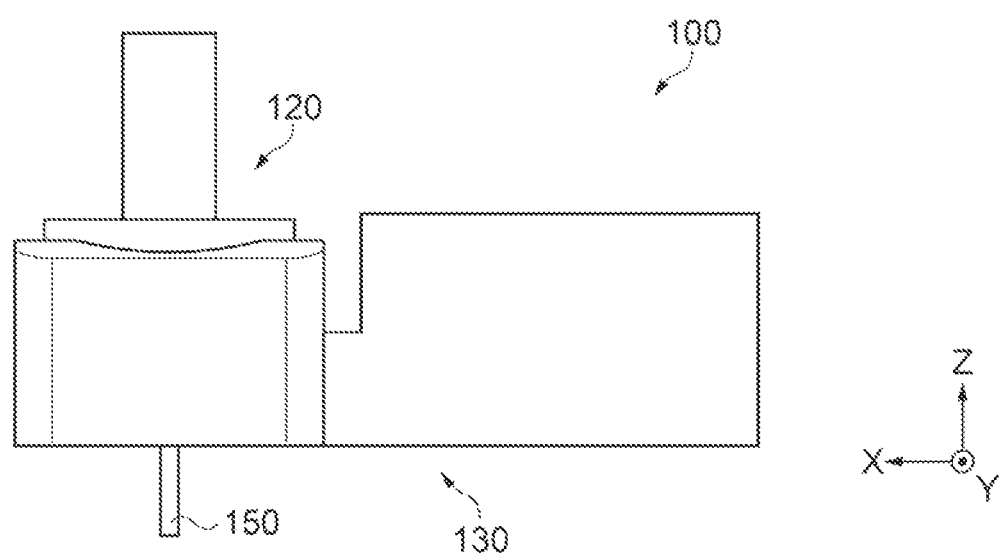
FIG. 4 is a plan view showing a schematic configuration of a first injection unit.
Figure 5:
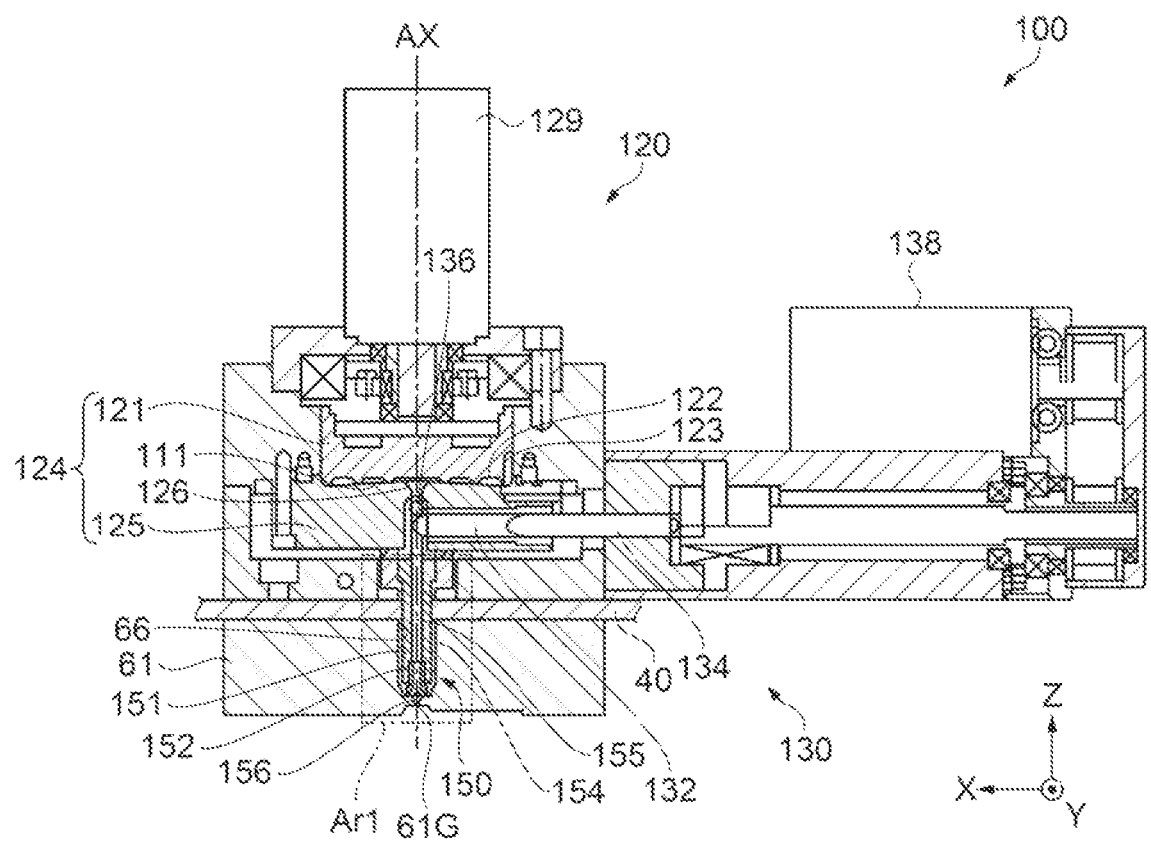
FIG. 5 is a cross-sectional view showing a detailed configuration of the first injection unit.

As shown in FIG. 4, the first injection unit 100 includes a plasticizing mechanism 120 and an injection unit 130. A hopper, which is not shown, is disposed at the plasticizing mechanism 120 in the +Y direction. The hopper supplies the thermoplastic material containing the thermoplastic resin, which is a raw material of the first molding material, to the plasticizing mechanism 120. The thermoplastic material is put into the hopper in the form of pellets, powder, or the like.

The plasticizing mechanism 120 melts and plasticizes at least a part of the thermoplastic material supplied from the hopper to generate the first molding material having fluidity.

The first molding material generated by the plasticizing mechanism 120 is supplied to the injection unit 130.

As shown in FIG. 5, the plasticizing mechanism 120 includes a flat screw 124 and a drive motor 129. The flat screw 124 includes the scroll 121, the barrel 125, and the first heating mechanism which is not shown. The scroll 121 has a substantially cylindrical shape, and a length along the axis AX is smaller than a diameter of the cross section. The axis of the scroll 121 coincides with the axis AX of the first nozzle 150.

In the scroll 121, a groove portion 122 is formed in a groove forming surface 111 which is an end surface on a side facing the barrel 125. A material inflow port 123 is formed in an outer peripheral surface of the scroll 121. The groove portion 122 is continuous to the material inflow port 123. The material inflow port 123 receives the thermoplastic material supplied from the hopper.

The barrel 125 has a substantially platen shape and faces the groove forming surface 111 of the scroll 121. A communication hole 126 penetrating the barrel 125 along the axis AX is formed in the barrel 125. The communication hole 126 functions as a flow path that guides the first molding material generated from the thermoplastic material to the first nozzle 150. An injection cylinder 132 penetrating the barrel 125 along an axis orthogonal to the axis AX is disposed in the barrel 125. The injection cylinder 132 constitutes a part of the injection unit 130 and communicates with the communication hole 126.

Figure 6:
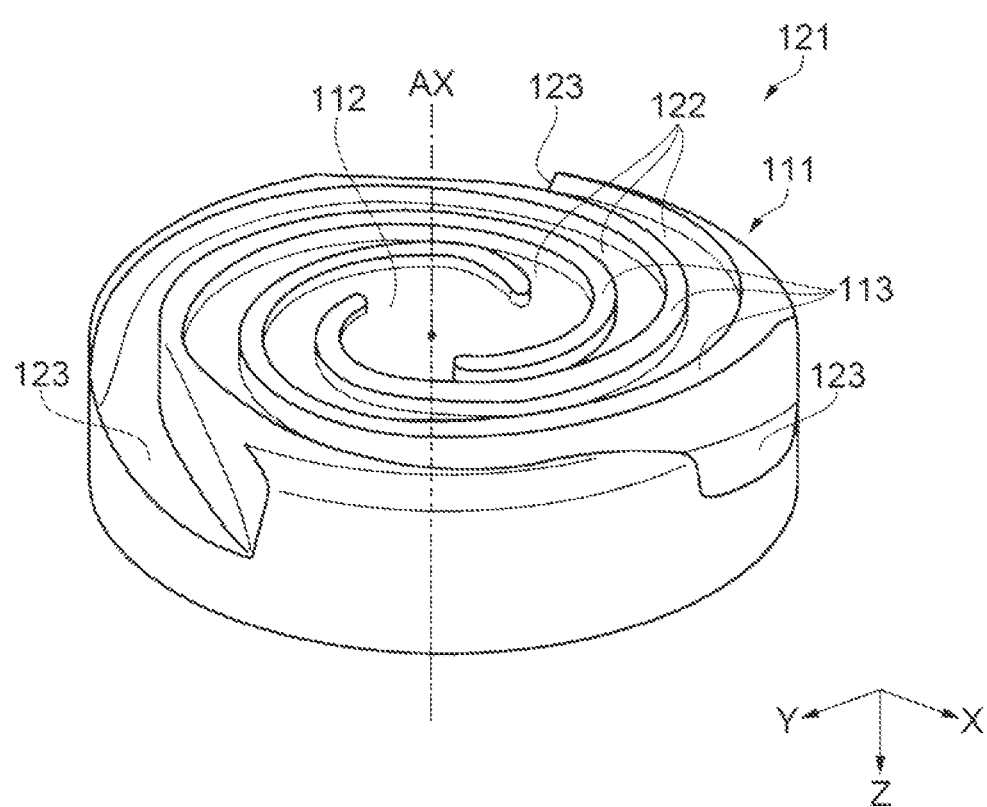
FIG. 6 is a perspective view showing a configuration of an end surface of a scroll.
Figure 7A:
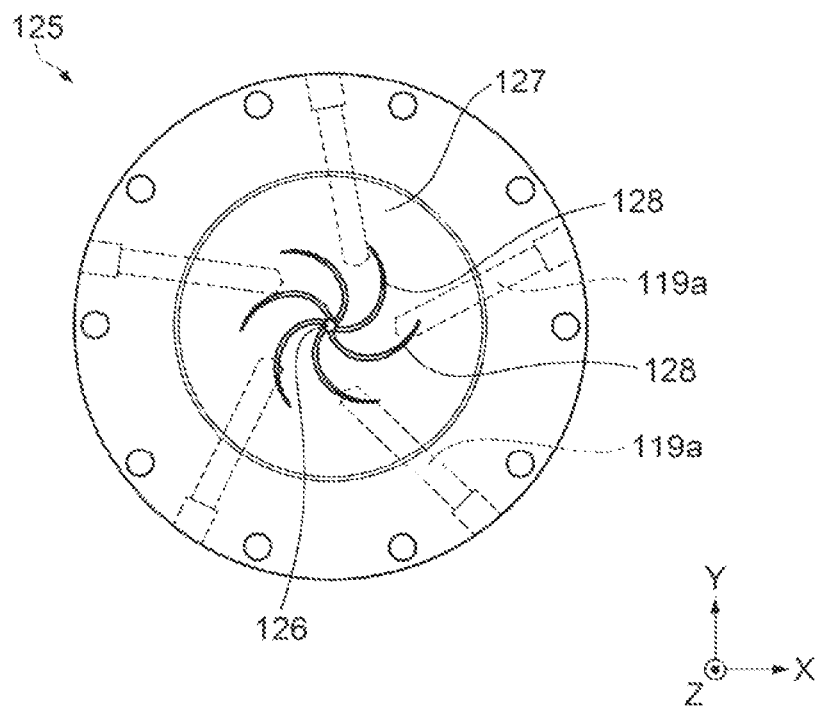
FIG. 7A is a plan view showing a configuration of a barrel.
Figure 7B:
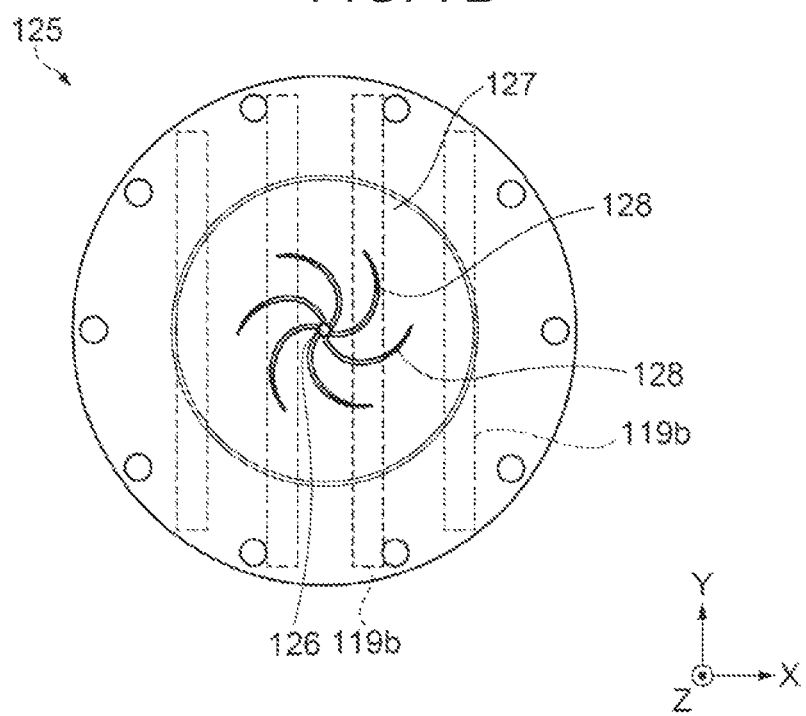
FIG. 7B is a plan view showing another configuration of the barrel.

As shown in FIG. 6, a central portion 112 of the groove forming surface 111 of the scroll 121 is a recess to which one end of the groove portion 122 is coupled. The central portion 112 faces the communication hole 126 of the barrel 125 to be described later. The central portion 112 intersects the axis AX. The groove portion 122 is a so-called scroll groove, and is formed in a spiral shape by drawing an arc from the center where the axis AX is located toward an outer peripheral surface side of the scroll 121.

In the groove portion 122, a depth of the groove gradually decreases from the outer peripheral surface side of the scroll 121 toward the center. The depth of the groove of the groove portion 122 is not limited to the above-described embodiment, and may be constant from the outer peripheral surface side to the center of the scroll 121. The groove portion 122 may be formed in a spiral shape. A ridge portion 113 is provided at the groove forming surface 111. The ridge portion 113 constitutes a side wall portion of the groove portion 122, and extends along each groove portion 122.

In the present embodiment, the three groove portions 122 and the three ridge portions 113 are disposed at the groove forming surface 111 of the scroll 121, whereas the present disclosure is not limited thereto. The number of the groove portions 122 and the ridge portions 113 is not limited to three, and may be any number which is one, two, or four or more. Any number of ridge portions 113 may be provided with respect to the number of groove portions 122.

In the outer peripheral surface of the scroll 121, three material inflow ports 123 are formed side by side at equal intervals along a circumferential direction, whereas the present disclosure is not limited thereto. The number of material inflow ports 123 may be any number which is one, two, or four or more. The material inflow ports 123 are not limited to being disposed at equal intervals, and may be disposed at different intervals.

As shown in FIG. 7A, the barrel 125 includes the communication hole 126, a facing surface 127, and a plurality of guide grooves 128. The facing surface 127 faces the groove forming surface 111 of the above-described scroll 121. The communication hole 126 is formed at the center of the facing surface 127 in a plan view from the +Z direction. The plurality of guide grooves 128 are coupled to the communication hole 126 and extend in a spiral shape from the communication hole 126 toward the outer periphery. The plurality of guide grooves 128 have a function of guiding the first molding material to the communication hole 126.

The plurality of guide grooves 128 are not limited to being coupled to the communication hole 126, and may be separated from the communication hole 126. The plurality of guide grooves 128 may be omitted.

The first heating mechanism 119a that heats the thermoplastic material is embedded in the barrel 125. The first heating mechanism 119a heats the thermoplastic material supplied between the groove forming surface 111 and the facing surface 127 of the barrel 125 to be described later. The first heating mechanism 119a is a rod-shaped electric cartridge heater. The first heating mechanism 119a is inserted into a substantially cylindrical space, which is not shown, radially formed from the communication hole 126 to the outer periphery of the barrel 125. The first heating mechanism 119a is controlled by the control unit 90 described above. A setting temperature of the first heating mechanism 119a, that is, a heating temperature of the thermoplastic material is appropriately set according to types, physical properties, and the like of the thermoplastic material.

Here, as another configuration of the first heating mechanism. 119a, the first heating mechanisms 119b and 119c are exemplified. As shown in FIG. 7B, the first heating mechanism 119b includes four rod-shaped heaters along the Y axis with respect to the first heating mechanism 119a. As shown in FIG. 7C, the first heating mechanism 119c includes two large and small ring-shaped heaters in a plan view from the +Z direction. The first heating mechanisms 119b and 119c are controlled by the control unit 90 in the same manner as the first heating mechanism 119a. According to the first heating mechanisms 119b and 119c, the setting temperature can be changed between the outside and the inside of the barrel 125, and the plasticization of the thermoplastic material can be precisely adjusted.

Although not shown, the flat screw 124 may be provided with a cooling device that cools the periphery of the flat screw 124. When the thermoplastic material is plasticized at an outer peripheral portion of the scroll 121, transportability of the thermoplastic material to the central portion 112 decreases, and the first molding material may not be stably generated. Therefore, the thermoplastic material may be prevented from being plasticized at the outer peripheral portion of the scroll 121 by the cooling device. Examples of the cooling device include a mode in which cooling water flows to the outer peripheral portion of the scroll 121 or the barrel 125.

Returning to FIG. 5, the drive motor 129 is coupled to an end surface of the scroll 121 in the +Z direction. The drive motor 129 is driven in accordance with an instruction from the control unit 90 described above, and rotates the scroll 121 about the axis AX as the rotation axis.

The thermoplastic material supplied from the material inflow port 123 is heated by the first heating mechanism 119a of the barrel 125 in the groove portion 122 of the scroll 121. Accordingly, at least a part of the thermoplastic material is melted and plasticized by being heated to increase fluidity, and becomes the first molding material. The first molding material is transported by the rotation of the scroll 121 and guided to the communication hole 126 of the barrel 125.

Accordingly, the first molding material is supplied from the plasticizing mechanism 120 to the injection unit 130 through the communication hole 126.

The injection unit 130 measures the first molding material supplied from the plasticizing mechanism 120 and injects the first molding material into a space defined by the first upper mold 61 and the lower mold 70 combined with the first upper mold 61 in a mold clamped state. The injection unit 130 includes the injection cylinder 132, an injection plunger 134, a check valve 136, an injection motor 138, and the first nozzle 150.

The injection cylinder 132 is a substantially cylindrical space, is formed inside the barrel 125, and communicates with the communication hole 126. The injection plunger 134 is slidably disposed in the injection cylinder 132, and reciprocates in the injection cylinder 132 along the X axis. When the injection plunger 134 slides away from the communication hole 126 in the −X direction, the first molding material in the communication hole 126 is drawn into the injection cylinder 132 and measured.

Next, when the injection plunger 134 slides toward the communication hole 126 in the +X direction, the first molding material in the injection cylinder 132 is pressure-fed to a first nozzle 150 side. Accordingly, the first molding material is injected into a space defined by the first upper mold 61 and the lower mold 70.

The check valve 136 is disposed in the communication hole 126 and is closer to the scroll 121 than is a communication portion between the injection cylinder 132 and the communication hole 126. The check valve 136 allows the first molding material to flow from the scroll 121 side to the first nozzle 150 side, and prevents the first molding material from flowing backward from the first nozzle 150 side to the scroll 121 side. When the injection plunger 134 slides toward the communication hole 126, a spherical valve body of the check valve 136 moves toward the scroll 121 to close the communication hole 126.

The injection motor 138 is driven in accordance with a command from the control unit 90 described above, and causes the injection plunger 134 to slide in the injection cylinder 132. A sliding speed and a sliding distance of the injection plunger 134 are appropriately set in accordance with the physical properties, a filling amount, and the like of the first molding material.

The first nozzle 150 is constituted by a so-called hot runner. The first nozzle 150 is disposed inside the first upper mold 61. The first nozzle 150 guides the first molding material to the first gate opening 61G of the first upper mold 61 in a heated state. The first nozzle 150 is formed in a nozzle attachment hole 66 penetrating along the axis AX described above. The first nozzle 150 includes a main body 151, a chip 152, and a heat insulating portion 154.

As shown in FIG. 8, the chip 152 is fixed to an end portion of the first nozzle 150 on a first gate opening 61G side, and functions as a tip end portion 156 of the first nozzle 150. The main body 151 of the first nozzle 150 has a substantially cylindrical shape. The tip end portion 156 has a substantially conical shape. The tip end portion 156 protrudes toward the first gate opening 61G.

A flow path 155 along the axis AX is formed inside the main body 151 and inside the chip 152. The flow path 155 guides the first molding material to the first gate opening 61G. The flow path 155 is branched at a nozzle port 153 formed in the tip end portion 156. The nozzle port 153 faces an end portion of the nozzle attachment hole 66 on a cavity side.

The two nozzle ports 153 are disposed side by side at equal intervals in the circumferential direction in the tip end portion 156. Here, the number of the nozzle ports 153 is not limited to two, and may be any number such as four. With the structure described above, the first gate opening 61G has an open gate structure called a so-called ring gate. Therefore, even when the first molding material is solidified, the flow path 155 is not closed and is always opened.

The first nozzle 150 includes a heater 157 as a second heating mechanism that heats the first nozzle 150. The heater 157 is embedded inside the first nozzle 150. The heater 157 is a coil heater and heats the first nozzle 150 under the control of the control unit 90. Accordingly, a molten state of the first molding material circulating through the flow path 155 is maintained. Therefore, solidification of the first molding material in the flow path 155 is prevented, and the first molding material can be effectively consumed to reduce a waste material.

The heater 157 includes a chip heater 158 and a nozzle heater 159. The chip heater 158 surrounds the chip 152. The nozzle heater 159 is disposed on a flat screw 124 side, which is upstream of the chip heater 158. The heater 157 is not limited to the two members which are the chip heater 158 and the nozzle heater 159, and may be a heater of a single member. The heater 157 is not limited to the coil heater, and may be a known heater such as a band heater.

The heat insulating portion 154 is located between the first nozzle 150 and the nozzle attachment hole 66. The heat insulating portion 154 prevents propagation of the heat of the first nozzle 150 to the first upper mold 61. The heat insulating portion 154 may be formed of the same thermoplastic material as the first molding material, may be formed of any material having a relatively low thermal conductivity, or may be formed as a gap.

3. First Molding Material

The first molding material injected in the first injection of the first injection unit 100 will be described. In the present specification, the term "plasticization" refers to melting of a material having thermoplasticity by application of heat thereto.

The first molding material is generated from a thermoplastic material containing a thermoplastic resin. Examples of the thermoplastic resin include engineering plastics such as polypropylene, polyethylene, polyacetal, polyvinyl chloride, polyamide, acrylonitrile-butadiene-styrene resin, polylactic acid, polyphenylene sulfide, polyether ether ketone, polycarbonate, modified polyphenylene ether, polybutylene terephthalate, polyethylene terephthalate, polysulfone, polyethylene sulfone, polyarylate, polyimide, polyamideimide, and polyetherimide. As the thermoplastic resin, one type of the resins or a combination of two or more types of the resins is used.

Pigments, metals, ceramics, and the like may be added to the thermoplastic material. Additives such as wax, flame retardant, antioxidant, and heat stabilizer may be added. Furthermore, fibers such as carbon fibers, glass fibers, cellulose fibers, and aramid fibers may be added.

The thermoplastic material is preferably injected from the first nozzle 150 in a state of being heated to a temperature equal to or higher than a glass transition temperature of the thermoplastic resin and completely melted. Specifically, for example, the acrylonitrile-butadiene-styrene resin having the glass transition temperature of approximately 120° C. is preferably injected at approximately 200° C.

4. Second Injection Unit

The configuration of the second injection unit 200 will be described with reference to FIGS. 9 to 12. FIG. 10 shows a cross section along the XZ plane including the axis AX passing through the center of the opening of the second nozzle 250. FIG. 10 also shows the fixed platen 40 and the second upper mold 62 in addition to the second injection unit 200. In FIG. 12, a peripheral portion of the first nozzle 150 and the first gate opening 61G corresponding to the first injection unit 100 and a peripheral portion of the second nozzle 250 and the second gate opening 62G corresponding to the second injection unit 200 are enlarged and displayed side by side in the same cross section as in FIGS. 5 and 10. For reference, the position of the first upper mold cavity 61C of the first upper mold 61 used in the first injection is indicated by a broken line in the peripheral portion of the second nozzle 250 in FIG. 12.

The second injection unit 200 has a component common to the first injection unit 100. Therefore, the same components as those of the first injection unit 100 are denoted by the same reference numerals, and redundant description thereof will be omitted.

Figure 9:
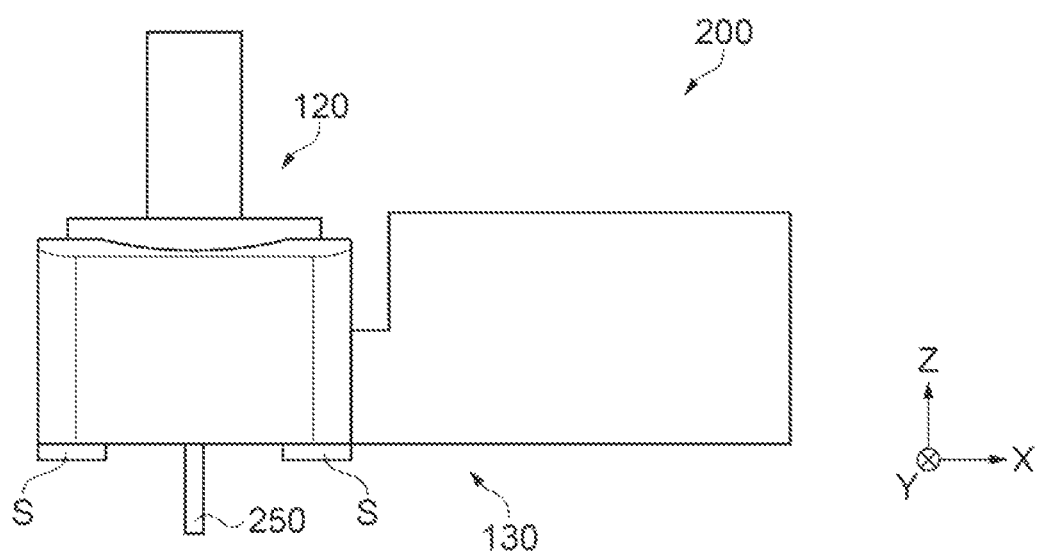
FIG. 9 is a plan view showing a schematic configuration of a second injection unit.
Figure 10:
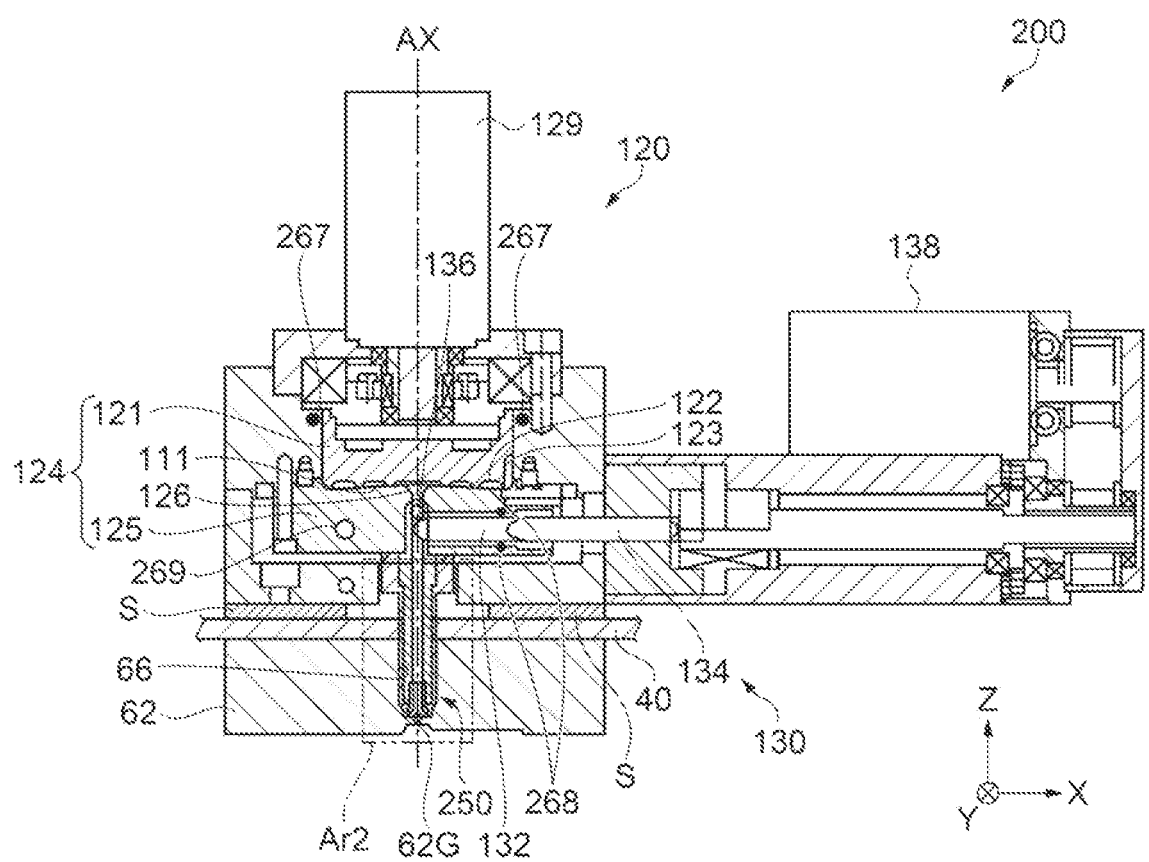
FIG. 10 is a cross-sectional view showing a detailed configuration of the second injection unit.

As shown in FIG. 9, the second injection unit 200 includes the second nozzle 250 instead of the first nozzle 150 of the first injection unit 100. In the second injection unit 200, a spacer S is provided at the plasticizing mechanism 120 in the −Z direction. On the other hand, the spacer S is not provided in the first injection unit 100 described above. The spacer S is a ring-shaped flat plate. Accordingly, the spacer S of the second injection unit 200 adjusts the position of the second nozzle 250 with respect to the first nozzle 150 of the first injection unit 100 in the −Z direction which is the injection direction.

Although not shown, instead of the hopper of the first injection unit 100, the above-described second molding material generation mechanism is provided at the plasticizing mechanism 120 of the second injection unit 200 in the +Y direction. The second molding material generation mechanism will be described later.

As shown in FIG. 10, the second injection unit 200 includes the flat screw 124 and the drive motor 129. The flat screw 124 includes the scroll 121, a barrel 125, and a first cooling mechanism to be described later.

The barrel 125 of the second injection unit 200 does not include the first heating mechanism 119a with respect to the barrel 125 of the first injection unit 100. Alternatively, although the first heating mechanism 119a may be provided, the first heating mechanism 119a is not operated in the second injection unit 200. This is because the second molding material circulating through the second injection unit 200 is thermosetting and may be cured in the second injection unit 200 by being heated. The second injection unit 200 includes the first cooling mechanism, which will be described later.

The first cooling mechanism includes a cooling water circulation device, which is not shown, and a cooling water flow path 269 in the barrel 125. The cooling water flow path 269 is a circulation path of the cooling water bored inside the barrel 125. In the cooling water flow path 269, the cooling water fed from the circulation device of the first cooling mechanism circulates and returns to the circulation device. Accordingly, the first cooling mechanism cools the barrel 125 of the flat screw 124 to cool the second molding material supplied between the groove forming surface 111 and the facing surface 127. A cooling temperature of the barrel 125 by the cooling water is not particularly limited, and is, for example, 20° C. or more and 30° C. or less. Therefore, it is possible to prevent the curing of the second molding material inside the second injection unit 200.

The second nozzle 250 is disposed inside the second upper mold 62. The second nozzle 250 guides the second molding material to the second gate opening 62G of the second upper mold 62 without heating the second molding material. The second nozzle 250 is formed in the nozzle attachment hole 66 penetrating along the axis AX described above.

The second molding material has a viscosity lower than that of the first molding material. Therefore, the second injection unit 200 has a seal structure 267 at a position in contact with an outer periphery of the end portion of the scroll 121 in the +Z direction. The seal structure 267 closes the gap between the plasticizing mechanism 120 and the scroll 121. The second injection unit 200 has a seal structure 268 at an end portion of the injection cylinder 132 in the +X direction. The seal structure 268 closes the gap between the injection plunger 134 and the injection cylinder 132. The seal structures 267 and 268 are, for example, O-rings. The seal structures 267 and 268 prevent the second molding material from leaking into and out of the second injection unit 200.

Figure 11:
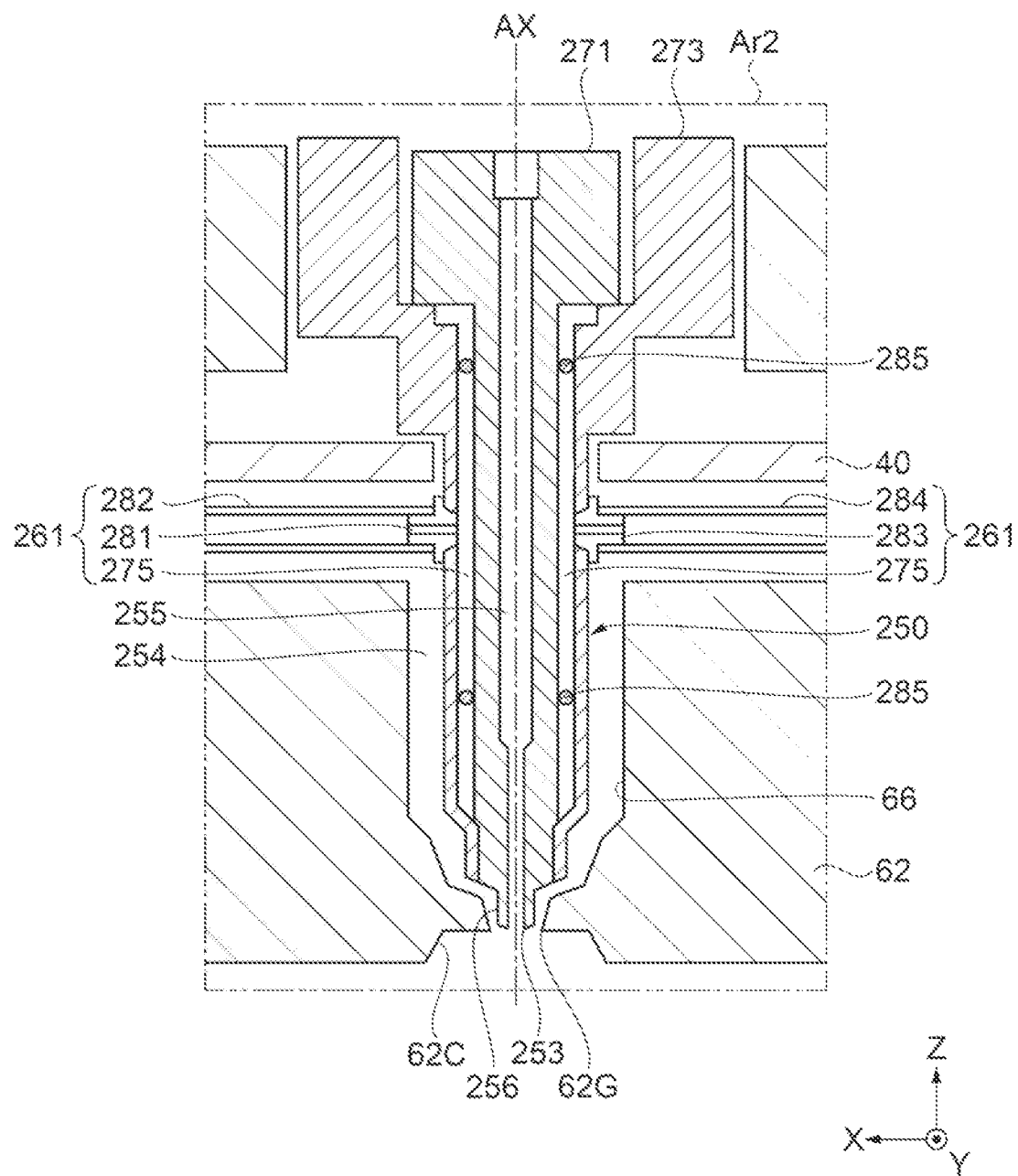
FIG. 11 is an enlarged cross-sectional view showing a region Ar in FIG. 10.
Figure 12:
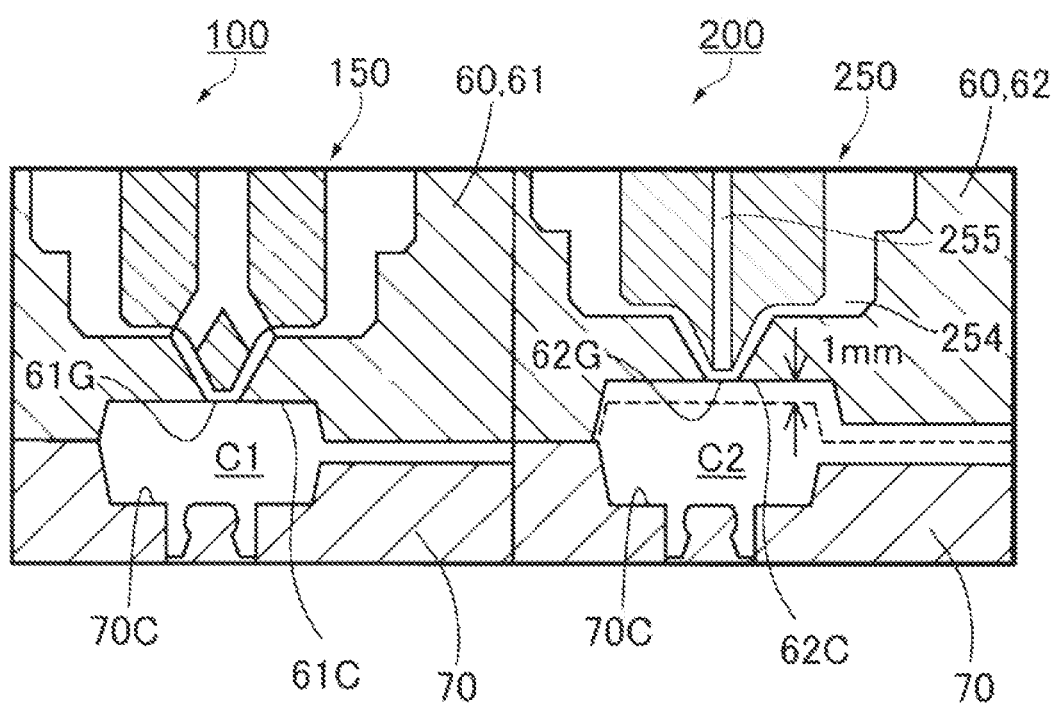
FIG. 12 is a schematic diagram showing positions of nozzles and gate openings along an injection direction.

As shown in FIG. 11, a main body 271 of the second nozzle 250 has a substantially cylindrical shape. The main body 271 is covered with a substantially cylindrical cover portion 273. A gap portion 275 is provided between the main body 271 and the cover portion 273. The gap portion 275 is located inside the main body 271 and continuously covers the main body 271 having the substantially cylindrical shape. The gap portion 275 is closed by two O-rings 285 in the +Z direction and the −Z direction. A space surrounded by the gap portion 275 and the two O-rings 285 serves as a flow path of the cooling water of a second cooling mechanism 261 to be described later. In the following description, the space surrounded by the gap portion 275 and the O-ring 285 is also simply referred to as the gap portion 275. The main body 271 is formed of, for example, copper. The cover portion 273 is formed of, for example, stainless steel.

A tip end portion 256 is disposed at a tip end of the second nozzle 250 in the −Z direction. The tip end portion 256 protrudes toward a second gate opening 62G side. One nozzle port 253 is formed in the tip end portion 256. A flow path 255 along the axis AX is formed from the inside of the main body 271 to the nozzle port 253. The flow path 255 guides the second molding material to the second gate opening 62G. The flow path 255 straightly continues to the cavity side along the axis AX up to the nozzle port 253 formed in the tip end portion 256. The nozzle port 253 of the second nozzle 250 is not limited to the above-described form, and may be a ring gate similar to the nozzle port 153 of the first nozzle 150.

The second injection unit 200 includes the second cooling mechanism 261 that cools the second nozzle 250. The second cooling mechanism 261 includes the gap portion 275, joint portions 281 and 283, pipe portions 282 and 284, and a cooling water circulation unit which is not shown.

The joint portions 281 and 283 face each other in the direction along the X axis with the main body 271 interposed therebetween. The joint portion 281 is located in the +X direction and the joint portion 283 is located in the −X direction with respect to the cover portion 273. The pipe portion 282 is coupled to the joint portion 281 in the +X direction. The pipe portion 284 is coupled to the joint portion 283 in the −X direction. The pipe portions 282 and 284 are, for example, liquid feed tubes formed of resin.

Although not shown, the +X direction of the pipe portion 282 and the −X direction of the pipe portion 284 are coupled to the cooling water circulation unit. The cooling water circulation unit is, for example, a chiller, and circulates the cooling water that cools the second nozzle 250.

The joint portions 281 and 283 are attached to the cover portion 273 by boring a side surface of the cover portion 273. The joint portions 281 and 283 penetrate the inside thereof. Therefore, a flow path of the cooling water is formed that returns from the cooling water circulation unit to the cooling water circulation unit again through the pipe portion 282, the joint portion 281, the gap portion 275, the joint portion 283, and the pipe portion 284. For example, the cooling water fed from the cooling water circulation unit flows into the gap portion 275 from the joint portion 281, and flows out from the joint portion 283 to the pipe portion 284 while absorbing the heat of the second nozzle 250. That is, the flow path 255 is cooled and kept at a predetermined temperature by the second cooling mechanism 261, and curing of the second molding material is prevented, so that occurrence of clogging of the second nozzle 250 can be prevented. The cooling temperature of the flow path 255 by the cooling water is not particularly limited, and is, for example, 20° C. or more and 30° C. or less.

A gap 254 is formed between the main body 271 of the second nozzle 250 and the second gate opening 62G. The gap 254 is located between the second nozzle 250 and the nozzle attachment hole 66 of the second upper mold 62. The gap 254 prevents the propagation of the heat of the second upper mold 62 to the second nozzle 250. The gap 254 may be filled with a known heat insulating material or the like. Accordingly, the curing of the second molding material in the flow path 255 can be prevented, and the occurrence of clogging of the second nozzle 250 can be prevented.

Returning to FIG. 10, the spacer S is disposed between the second injection unit 200 and the fixed platen 40 and surrounds the second nozzle 250. In the present embodiment, a thickness of the spacer S in the direction along the Z axis is approximately 1 mm. Accordingly, when the second injection is performed after the first injection, the second nozzle 250 is located in the +Z direction with respect to the first nozzle 150. That is, when the second molding material is injected after the first molding material, the second gate opening 62G is formed at a position that is farther from the lower mold 70 than is the first gate opening 61G.

When the second molding material is injected before the first molding material, the spacer S is not disposed in the second injection unit 200, and the spacer S is disposed in the first injection unit 100. According to this, the second nozzle 250 is located in the −Z direction with respect to the first nozzle 150. That is, when the second injection is performed before the first injection, the second gate opening 62G is formed at a position that is closer to the lower mold 70 than is the first gate opening 61G.

As shown in FIG. 12, in the injection molding apparatus 10, the second nozzle 250 of the second injection unit 200 is shifted by approximately 1 mm in the +Z direction from the first nozzle 150 of the first injection unit 100. In the first upper mold 61 and the second upper mold 62, the first gate opening 61G and the second gate opening 62G, and the first upper mold cavity 61C and the second upper mold cavity 62C are designed in advance corresponding to the positions of the first nozzle 150 and the second nozzle 250 in the direction along the Z axis. Therefore, the second gate opening 62G of the second upper mold 62 is located downstream of the first gate opening 61G of the first upper mold 61 in the −Z direction, which is the injection direction, by approximately 1 mm. Therefore, the second gate opening 62G applied to the second injection performed after the first injection is located upstream of the first gate opening 61G applied to the first injection in the injection direction, and is disposed away from the lower mold 70.

In the mold clamped state, a volume of a second cavity C2 defined by the second upper mold 62 and the lower mold 70 of the second injection unit 200 is larger than a volume of a first cavity C1 defined by the first upper mold 61 and the lower mold 70 of the first injection unit 100. The first cavity C1 corresponds to a space formed by the first upper mold cavity 61C and the lower mold cavity 70C. The second cavity C2 corresponds to a space formed by the second upper mold cavity 62C and the lower mold cavity 70C.

Accordingly, when a molded article is manufactured from the first molding material and the second molding material, it is possible to prevent occurrence of a filling failure of the molding material to be injected later. Specifically, with the arrangement described above, the second injection is performed at a position away from the lower mold 70 in the +Z direction with respect to the first injection. Therefore, the first molding material injected in the first injection is prevented from narrowing the gate opening into which the second molding material of the second injection flows. Accordingly, the filling of the second molding material of the second injection is performed without shortage.

When the second injection is performed before the first injection, the spacer S is removed from the second injection unit 200 instead of being disposed in the first injection unit 100. When the injection molding apparatus 10 includes three or more injection units, the thickness of the spacer S along the Z axis may be accordingly changed or the number of spacers S to be disposed may be accordingly changed.

5. Second Molding Material

The second molding material injected in the second injection of the second injection unit 200 will be described. In the present specification, thermosetting refers to a property of curing as a polymerization reaction proceeds due to heat. The second molding material is a mixture containing a thermosetting material having thermosetting properties and a polymerization initiator, and may contain an additive or the like.

Examples of the thermosetting material include known thermosetting resins such as a silicone resin, a phenol resin, an epoxy resin, polyurethane, and polyimide. As the polymerization initiator, a known curing catalyst or the like corresponding to the above-described thermosetting resin is employed.

The second molding material is produced by mixing a first liquid containing the thermosetting material and a second liquid containing the polymerization initiator. When the first liquid and the second liquid are mixed, the polymerization reaction gradually proceeds even at a room temperature. Therefore, it is preferable that the first liquid and the second liquid are mixed immediately before the second injection. Therefore, the second injection unit 200 includes a pressure feed pump and a measurement pump for the first liquid, and a pressure feed pump and a measurement pump for the second liquid, which will be described later.

Pigments, metals, ceramics, and the like may be added to the second molding material. Additives such as wax, flame retardant, antioxidant, and heat stabilizer may be added. Furthermore, fibers such as carbon fibers, glass fibers, cellulose fibers, and aramid fibers may be added.

6. Second Molding Material Generation Mechanism

Figure 13:
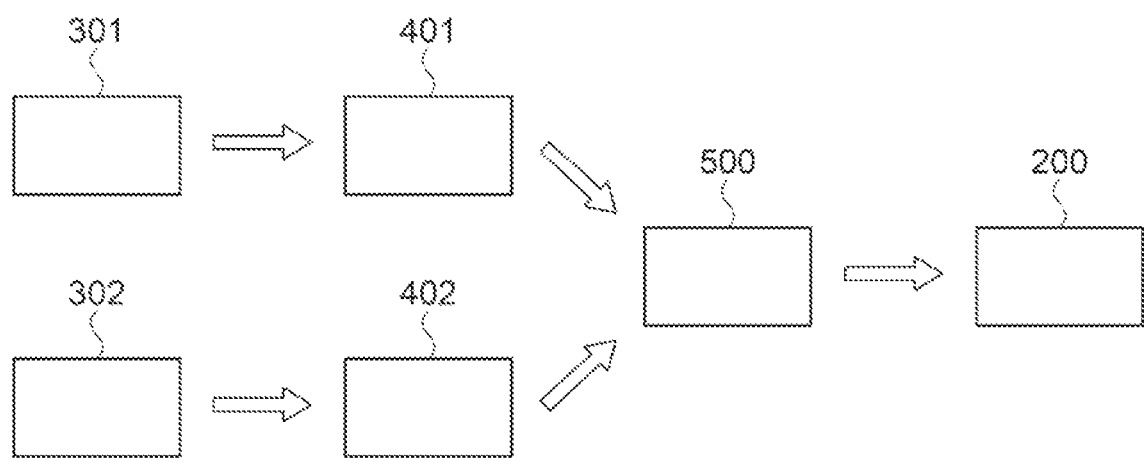
FIG. 13 is a block diagram showing a schematic configuration of a second molding material generation mechanism.

As shown in FIG. 13, the second molding material generation mechanism of the injection molding apparatus 10 includes pressure feed pumps 301 and 302, measurement pumps 401 and 402, and a mixing device 500. Since the second molding material is of a two-liquid mixing type, the second molding material includes two systems, that is, the pressure feed pump 301 and the measurement pump 401 for the first liquid and the pressure feed pump 302 and the measurement pump 402 for the second liquid.

Although not shown, each of the pressure feed pumps 301 and 302 includes a raw material container, an air absorption port, and a material pressure feed port. Each air absorption port is supplied with compressed air via a pipe. The compressed air is adjusted to a predetermined pressure by pressure regulating valves of the pressure feed pumps 301 and 302. By the compressed air, the first liquid and the second liquid that are supplied from the raw material containers are pressure-fed to the measurement pumps 401 and 402 through the material pressure feed ports. Known devices can be employed as the pressure feed pumps 301 and 302.

Although not shown, each of the measurement pumps 401 and 402 has a measurement motor and a material supply port. The measurement pumps 401 and 402 measure, by the measurement motors, the first liquid and the second liquid that are pressure-fed from the pressure feed pumps 301 and 302, and feed the first liquid and the second liquid from the material supply ports to the mixing device 500. A mixing ratio of the first liquid containing the thermosetting material and the second liquid containing the polymerization initiator is controlled using a measurement function of the measurement pumps 401 and 402. Known devices can be employed as the measurement pumps 401 and 402.

The mixing device 500 mixes the first liquid and the second liquid supplied from the measurement pumps 401 and 402 of the two systems to generate the second molding material. The mixing device 500 is, for example, a static mixer, and supplies the generated second molding material to the second material supply unit 202 of the second injection unit 200. As the mixing device 500, a known device including a static mixer can be employed.

The second molding material is fed to the injection unit 130 through the flat screw 124. At this time, the scroll 121 may not be rotated. Alternatively, the second molding material may be directly fed from the second material supply unit 202 to the injection unit 130 without passing through the flat screw 124.

The second molding material generation mechanism including the pressure feed pumps 301 and 302, the measurement pumps 401 and 402, and the mixing device 500 is not limited to the above-described form. As another form of the second molding material generation mechanism, for example, the mixing device 500 may be omitted, and the second molding material generation mechanism may include the pressure feed pumps 301 and 302, the measurement pumps 401 and 402, and the plasticizing mechanism 120. Specifically, the second molding material may be produced by mixing the first liquid and the second liquid with the flat screw 124 of the plasticizing mechanism 120. In other words, the function of the mixing device 500 may be carried out by the plasticizing mechanism 120. In this case, in order to individually supply the first liquid and the second liquid to the plasticizing mechanism 120, a joint of an inlet 2 and an outlet 1 is coupled to the second material supply unit 202.

7. Injection Molding Method

Figure 14:
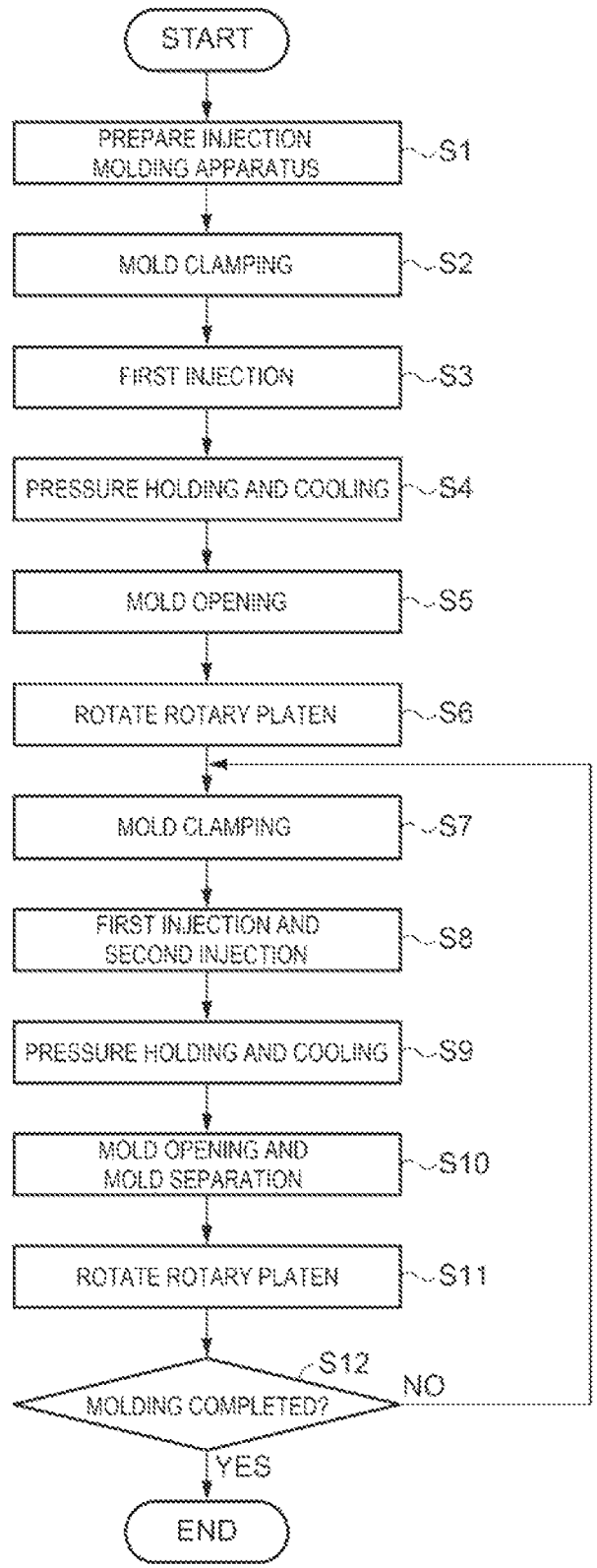
FIG. 14 is a step flowchart showing an injection molding method.

An injection molding method using the injection molding apparatus 10 will be described with reference to FIG. 14. In the following description, FIG. 1 and the like are also referred to. As shown in FIG. 14, the injection molding method using the injection molding apparatus 10 includes steps S1 to S12. A step flow described below is an example, and the present disclosure is not limited thereto.

In step S1, the injection molding apparatus 10 is prepared. At this time, the upper mold 60 and the lower mold 70 that correspond to the desired molded article are attached to the injection molding apparatus 10, and the injection molding apparatus 10 is brought into a mold opened state. Raw materials of the first molding material and the second molding material are supplied. Heating mechanisms and the cooling mechanisms of the first injection unit 100 and the second injection unit 200 are operated.

When the first upper mold 61 and one of the lower molds 70 do not face each other, the rotary platen 30 is rotated by the position changing mechanism 35, so that the first upper mold 61 and one of the lower molds 70 face each other. Accordingly, the second upper mold 62 and the other one of the lower molds 70 naturally face each other. At a stage of step S1, the first molding material and the second molding material may be generated for the first injection and the second injection. Then, the processing moves to step S2.

In step S2, mold clamping is performed by the mold opening and closing motor 81. Accordingly, the first cavity C1 to be filled with the first molding material by the first injection is formed. Although the second injection is not performed in the next step S3, the second cavity C2 is also formed at the same time. Then, the processing moves to step S3.

In step S3, the first injection is performed. The first cavity C1 is filled with the first molding material from the first nozzle 150 of the first injection unit 100. Then, the processing moves to step S4.

In step S4, pressure holding and cooling are performed while maintaining the mold clamped state. In the pressure holding, the first cavity C1 is replenished with the first molding material. In the cooling, the first molding material in the first cavity C1 is cooled to a temperature equal to or lower than the melting point. Accordingly, the first molding material in the first cavity C1 is solidified, and an intermediate body of the molded article formed of the first molding material is formed. Then, the processing moves to step S5.

In step S5, the mold opening is performed. The mold opening and closing motor 81 separates the first upper mold 61 and one of the lower molds 70 from each other. At this time, the intermediate body of the first molding material remains on a lower mold 70 side. Then, the processing moves to step S6.

In step S6, the rotary platen 30 is rotated. At this time, the lower mold 70, in which the intermediate body of the first molding material remains, and the second upper mold 62 face each other. The first upper mold 61 and the empty lower mold 70 without the intermediate body naturally face each other. Then, the processing moves to step S7.

In step S7, the mold clamping is performed. Accordingly, the second cavity C2 is formed by the lower mold 70 in which the intermediate body remains and the second upper mold 62. An empty first cavity C1 is also formed by the first upper mold 61 and the empty lower mold 70. Then, the processing moves to step S8.

In step S8, the second injection is performed. The second cavity C2 is filled with the second molding material from the second nozzle 250 of the second injection unit 200. Here, when a plurality of molded articles are continuously manufactured, the first injection may be performed for the first cavity C1. Then, the processing moves to step S9.

In step S9, the pressure holding and the cooling are performed while maintaining the mold clamped state. In the pressure holding, the second cavity C2 is replenished with the second molding material, and the curing of the thermosetting material is completed. In the cooling, the second molding material in the second cavity C2 is cooled. Accordingly, the second molding material in the second cavity C2 is integrated with the intermediate body of the first molding material to form the molded article. Here, when the first injection is also performed in step S8, the intermediate body of the first molding material is also formed as described above. Then, the processing moves to step S10.

In step S10, mold opening and mold separation are performed. First, the second upper mold 62 and the lower mold 70 are separated from each other. At this time, the molded article is mold separated by the above-described extrusion pin corresponding to the second cavity C2. When the intermediate body of the first molding material is formed in step S9, the intermediate body remains in the lower mold 70 without being mold separated. Then, the processing moves to step S11.

In step S11, the rotary platen 30 is rotated to cause the first upper mold 61 and the second upper mold 62 to face the lower mold 70. When the intermediate body of the first molding material is formed in step S10, the lower mold 70 on which the intermediate body remains and the second upper mold 62 face each other. Then, the processing moves to step S12.

In step S12, completion of the injection molding is determined. When the molding is completed (YES), that is, when the intermediate body of the first molding material does not remain in the lower mold 70, the step is completed here. When the molding is not completed (NO), that is, when the intermediate body remains in the lower mold 70, the processing returns to step S7 and the molding is continued.

When three or more injection units, and three or more upper molds 60 and lower molds 70 are used, similar to the above, the injection from different injection units may be simultaneously performed to continuously form the molded article.

According to the present embodiment, the following effects can be attained.

A molded article can be obtained from a thermoplastic material and a thermosetting material. Specifically, the first injection unit 100 injects the first molding material of the thermoplastic material into the first upstream mold 61 clamped with the downstream mold 70. The second injection unit 200 injects the second molding material of the thermosetting material into the second upstream mold 62 clamped with the downstream mold 70. Accordingly, it is possible to provide the injection molding apparatus 10 that molds the molded article from the thermoplastic material and the thermosetting material.

Other Aspects

In the above embodiment, the plasticizing mechanism 120 provided in the first injection unit 100 includes the flat screw 124. On the other hand, the plasticizing mechanism 120 may include, instead of the flat screw 124, an in-line screw in which a spiral groove is formed in a long shaft, and a cylindrical barrel surrounding the in-line screw, and plasticize a thermoplastic material using relative rotation between the in-line screw and the cylindrical barrel to generate a first molding material.

What is claimed is:

1. An injection molding apparatus configured to mold a molded article containing a first molding material and a second molding material, the injection molding apparatus comprising:

a first upstream mold having a first vertical hole and a first gate opening, the first gate opening being provided at a bottom of the first vertical hole;

a second upstream mold having a second vertical hole and a second gate opening, the second gate opening being provided at a bottom of the second vertical hole;

a first injection unit having a first nozzle, at least a half length of the first nozzle being inserted into the first vertical hole, the first nozzle being configured to inject the first molding material through the first gate opening;

a second injection unit having a second nozzle, at least a half length of the second nozzle being inserted into the second vertical hole, the second nozzle being configured to inject the second molding material through the second gate opening;

a downstream mold configured to be clamped to each of the first upstream mold and the second upstream mold, a memory configured to store a program; and a processor configured to execute the program so as to control the injection molding apparatus, wherein the first injection unit includes a plasticizing mechanism, the plasticizing mechanism is configured with a first screw and a first heater, and the first screw and the first heater are configured to plasticize at least a part of a thermoplastic material containing a thermoplastic resin to generate the first molding material, the second injection unit includes a mixer, and the mixer is configured to mix a resin and a curing agent to generate the second molding material that is a thermosetting mixture, an outer circumference surface of the second nozzle is spaced apart from an inner wall of the second vertical hole via a gap, the first screw includes:
a first scroll having a first groove forming surface on which a first groove is formed, and
a first barrel having a first facing surface that faces the first groove forming surface and a first communication hole, the first heater is configured to heal the thermoplastic material supplied between the first groove forming surface and the first facing surface, the first heater includes an outer heater and an inner heater, and the inner heater is arranged closer to the first communication hole than the outer heater, and the processor is configured to individually control a temperature of the outer heater and a temperature of the inner heater.

2. The injection molding apparatus according to claim 1, wherein the second injection unit further includes:
a second scroll having a second groove forming surface on which a second groove is formed;
a second barrel having a second facing surface that faces the second groove forming surface and a second communication hole; and
a first cooler configured to cool the second molding material supplied between the second groove forming surface and the second facing surface.

3. The injection molding apparatus according to claim 1, wherein the first injection unit further includes a second heater, and the second heater is configured to heat the first nozzle.

4. The injection molding apparatus according to claim 1, wherein the second injection unit further includes a second cooler, and the second cooler is configured to cool the second nozzle.

5. The injection molding apparatus according to claim 4, wherein the second cooler includes a cover, and the cover is provided around the outer circumference surface of the second nozzle, a flow path, through which a cooling material flows, is formed between the outer circumference surface of the second nozzle and the cover, and an outer circumference surface of the cover is spaced apart from the inner wall of the second vertical hole.

6. The injection molding apparatus according to claim 1, wherein when the second molding material is injected via the second nozzle after the first molding material is injected via the first nozzle, the second gate opening is located at a position that is farther from the downstream mold than the first gate opening, and when the second molding material is injected via the second nozzle before the first molding material is injected via the first nozzle, the second gate opening is located at a position that is closer to the downstream mold than the first gate opening.

* * * * *